(12) United States Patent
De Gaillard

(10) Patent No.: US 6,672,658 B2
(45) Date of Patent: Jan. 6, 2004

(54) VEHICLE WITH A VEHICLE ROOF THAT CAN BE OPENED

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/018,973

(22) PCT Filed: May 22, 2001

(86) PCT No.: PCT/EP01/05877

§ 371 (c)(1),
(2), (4) Date: Apr. 25, 2002

(87) PCT Pub. No.: WO01/89869

PCT Pub. Date: Nov. 29, 2001

(65) Prior Publication Data

US 2002/0135200 A1 Sep. 26, 2002

(30) Foreign Application Priority Data

May 23, 2000 (DE) .......................................... 100 25 051

(51) Int. Cl.⁷ ................................................. B60J 7/047
(52) U.S. Cl. .................... 296/220.01; 296/222; 296/223
(58) Field of Search ....................... 296/146.14, 107.07, 296/107.08, 107.2, 216.01, 217, 220.01, 221, 222, 216.07, 216.04, 216.05, 223

(56) References Cited

U.S. PATENT DOCUMENTS

| 2,263,216 A | 11/1941 | Latchford |
| 2,785,922 A | 3/1957 | Chika |
| 4,968,089 A | 11/1990 | Murai et al. |
| 5,242,210 A * | 9/1993 | Fujisawa et al. ............. 296/223 |
| 6,419,308 B1 * | 7/2002 | Corder et al. ........... 296/216.04 |
| 6,474,731 B2 * | 11/2002 | De Gaillard ........... 296/146.14 |
| 2002/0084677 A1 * | 7/2002 | Dittrich et al. .............. 296/217 |

FOREIGN PATENT DOCUMENTS

| DE | 1 96 34 507 C1 | 11/1999 |
| EP | 0 101 322 A2 | 2/1984 |
| EP | 0 591 644 B1 | 4/1994 |
| FR | 2 718 485 | 10/1995 |

\* cited by examiner

Primary Examiner—Stephen T. Gordon
Assistant Examiner—Jason Morrow
(74) Attorney, Agent, or Firm—Nixon Peabody LLP; David S. Safran

(57) ABSTRACT

A motor vehicle, with a motor vehicle roof (4) with body-mounted lengthwise roof beams (5), with a roof opening (8) in the motor vehicle roof (4), with a movable cover (9) for selectively closing or at least partially clearing the roof opening (8), and with a rear window (11) which adjoins the motor vehicle roof (4), and a trunk lid (2), and the cover (9) and rear window (11) can be moved by a guide mechanism into the open position in which they are located on top of one another on the trunk lid (2). In another embodiment, the roof opening extends essentially over the entire vehicle interior and can be closed by a cover arrangement which has at least two cover elements, the cover elements being guided on lateral guides, and when the roof opening is cleared, being moved along the lengthwise roof beams into a rear storage space in a packed position and especially in an essentially upright position.

31 Claims, 10 Drawing Sheets

VEHICLE WITH A VEHICLE ROOF THAT CAN BE OPENED

BACKGROUND OF THE INVENTION

1. Field of the Invention

The invention relates to a motor vehicle, especially a limousine or a coupe, with a motor vehicle roof with body-mounted lengthwise roof beams, with a roof opening in the motor vehicle roof, with a movable cover for selectively closing or at least partially clearing the roof opening, and with a rear window which adjoins the motor vehicle roof and a trunk lid.

2. Description of Related Art

When driving in an open passenger car, such as, for example, a convertible, in an accident with overturning of the vehicle, there is a high risk of injury to the passengers. Therefore, in convertibles there are fixed or retractable roll bars for passenger protection when the roof is opened. Limousines and coupes offer high safety in a rollover, but when an openable roof, for example, a sliding roof, is installed, only a limited roof opening is possible, which ordinarily cannot impart the feeling of driving in an open convertible.

Published European Patent Application EP 0 591 644 B1 describes a motor vehicle with a roof which has a roof opening which can be selectively closed or at least partially opened by means of the louvers of a louvered roof. To open the roof opening, the louvers which are movably supported on bilateral roof-mounted guides are moved to the rear to under the fixed roof part which adjoins the roof opening to the rear. In the lowered position, the louvers can be stacked into a package of relatively low height or they are located at a mutual vertical distance like blinds in front of the rear window.

French Patent FR 2 718 485 discloses a sliding headliner for a closed, transparent motor vehicle roof. The sliding headliner contains individual louvers which are movably supported on bilateral lengthwise roof beams. When the sliding headliner is opened, the individual louvers are pushed to the rear to under the transparent motor vehicle roof into a storage position in which they are located on top of one another as a package.

German Patent DE 196 34 507 C1 discloses a motor vehicle roof which can be lowered into the rear of a passenger car. A movable roof arrangement which is provided selectively for closing or clearing a roof opening is made especially as a louvered roof which when opened can be folded up in the form of a package on the roof frame and can be lowered with the motor vehicle roof in the rear of the vehicle.

SUMMARY OF THE INVENTION

The object of the invention is to provide the initially described type of motor vehicle with a roof which can be opened over a large area and which still has a high stiffness as passenger protection in a vehicle rollover. Furthermore, the components which have been removed from the roof opening will be stored in a space-saving manner.

The object is achieved in the initially mentioned motor vehicle in accordance with the invention in that the cover and rear window can be moved by guide means into the open position in which they are located on top of one another on the trunk lid.

In this way, a roof opening can be formed which extends as in a convertible from the front window as far as the trunk lid over the entire passenger compartment, but compared to a convertible, the lengthwise roof beams remain in their body-mounted arrangement and thus provide passenger protection if the motor vehicle rolls over and comes to rest on the roof. The lengthwise roof beams are attached via the rear roof columns, for example, the C columns, to the body. Deposition on the trunk lid does not require any space in the vehicle interior or in the trunk.

The object is also achieved in the initially mentioned motor vehicle according to the invention in that the roof opening extends essentially over the entire vehicle interior and can be closed by means of a cover arrangement which has at least two cover elements and that the cover elements are guided on lateral guides and when the roof opening is cleared are moved along the lengthwise roof beams into a rear storage space and deposited therein in the packed position and especially in the essentially upright position. In this motor vehicle, a roof opening can also be formed which, like in a convertible, extends from the front window to the trunk lid over the entire passenger compartment, but compared to the convertible, the lengthwise roof beams remain in their body-mounted arrangement and thus provide improved passenger protection if the vehicle rolls over and comes to rest on the roof.

The rear storage space for the roof dividing elements is preferably in the lowered position so that it is not raised or is not significantly raised over the equator line of the motor vehicle which is formed by the lower edge of the side windows and the trunk lid. Thus, visibility from the vehicle interior to the rear is not obstructed. The storage space is thus behind the rear seats roughly underneath the top edge of the rear seats in a four-seat or five-seat limousine or in one such coupe.

Embodiments of the respective motor vehicle are explained in detail below with reference to the accompanying drawings.

DETAILED DESCRIPTION OF THE INVENTION

Figure 1:
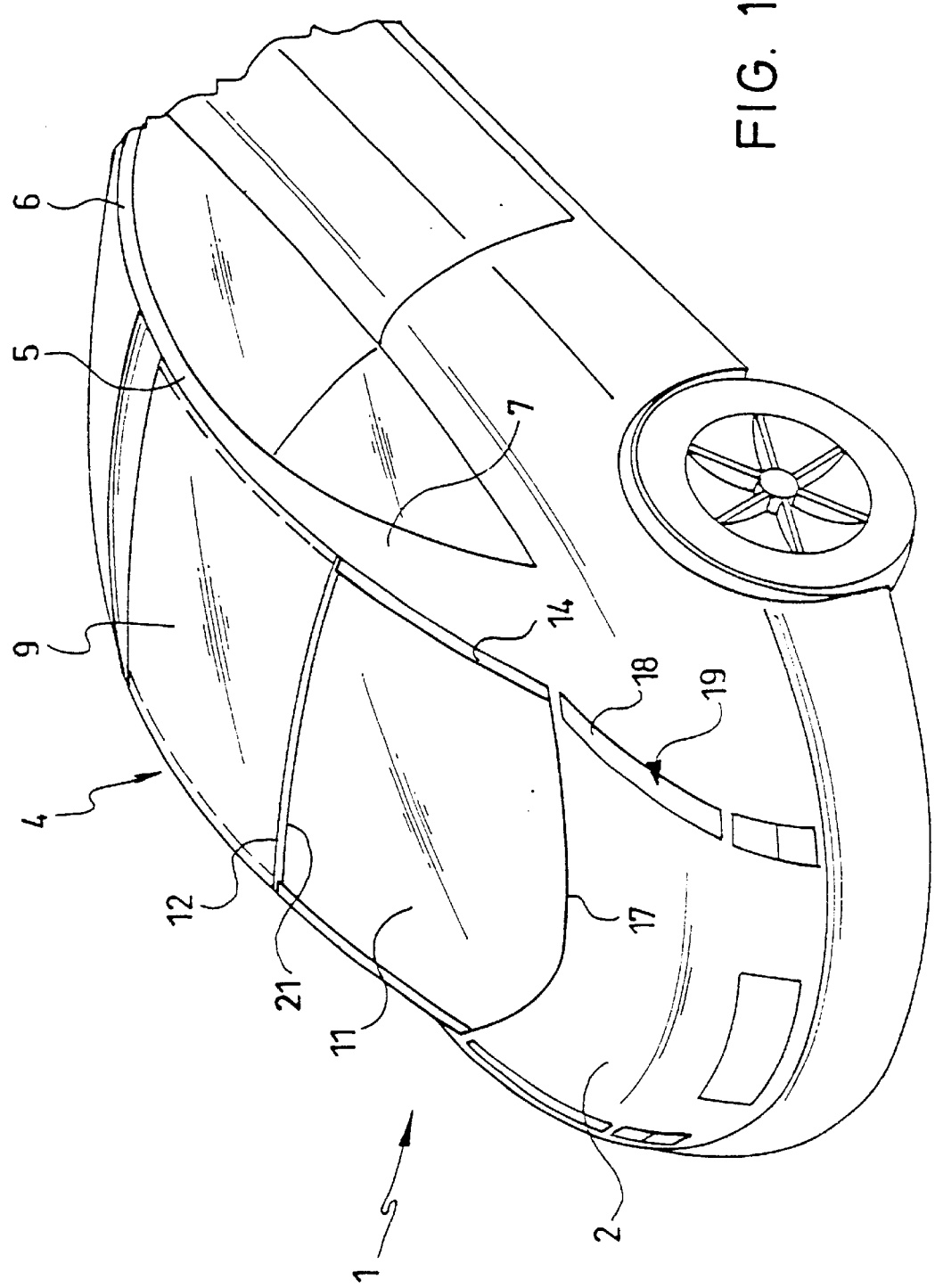
FIG. 1 is perspective rear view of one embodiment of a motor vehicle with a movable cover and a movable rear window in the closed position.
Figure 2:
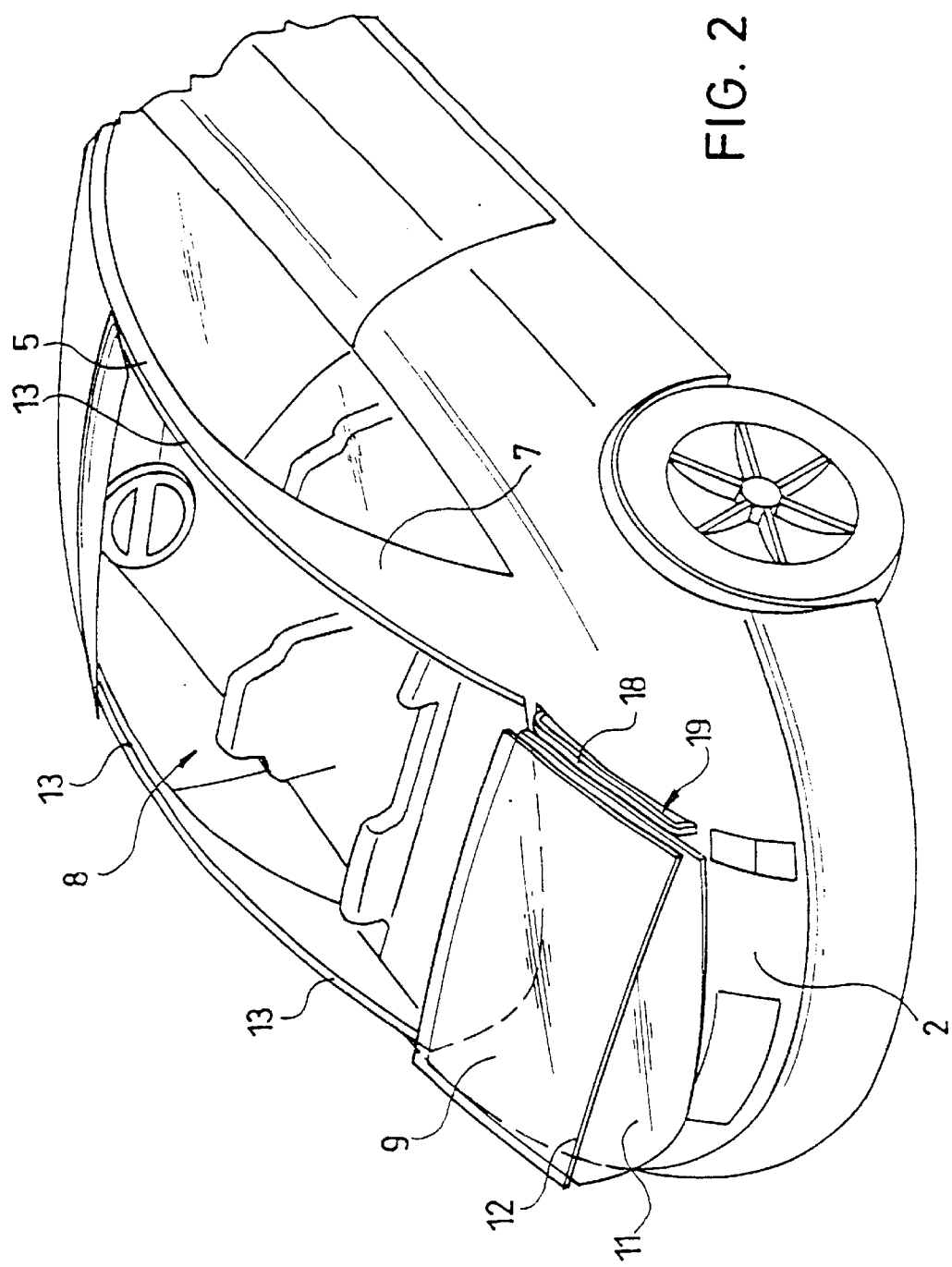
FIG. 2 is a perspective rear view of the motor vehicle as shown in FIG. 1 but with the roof open and the rear window and the cover on top of one another on the trunk lid.
Figure 3:
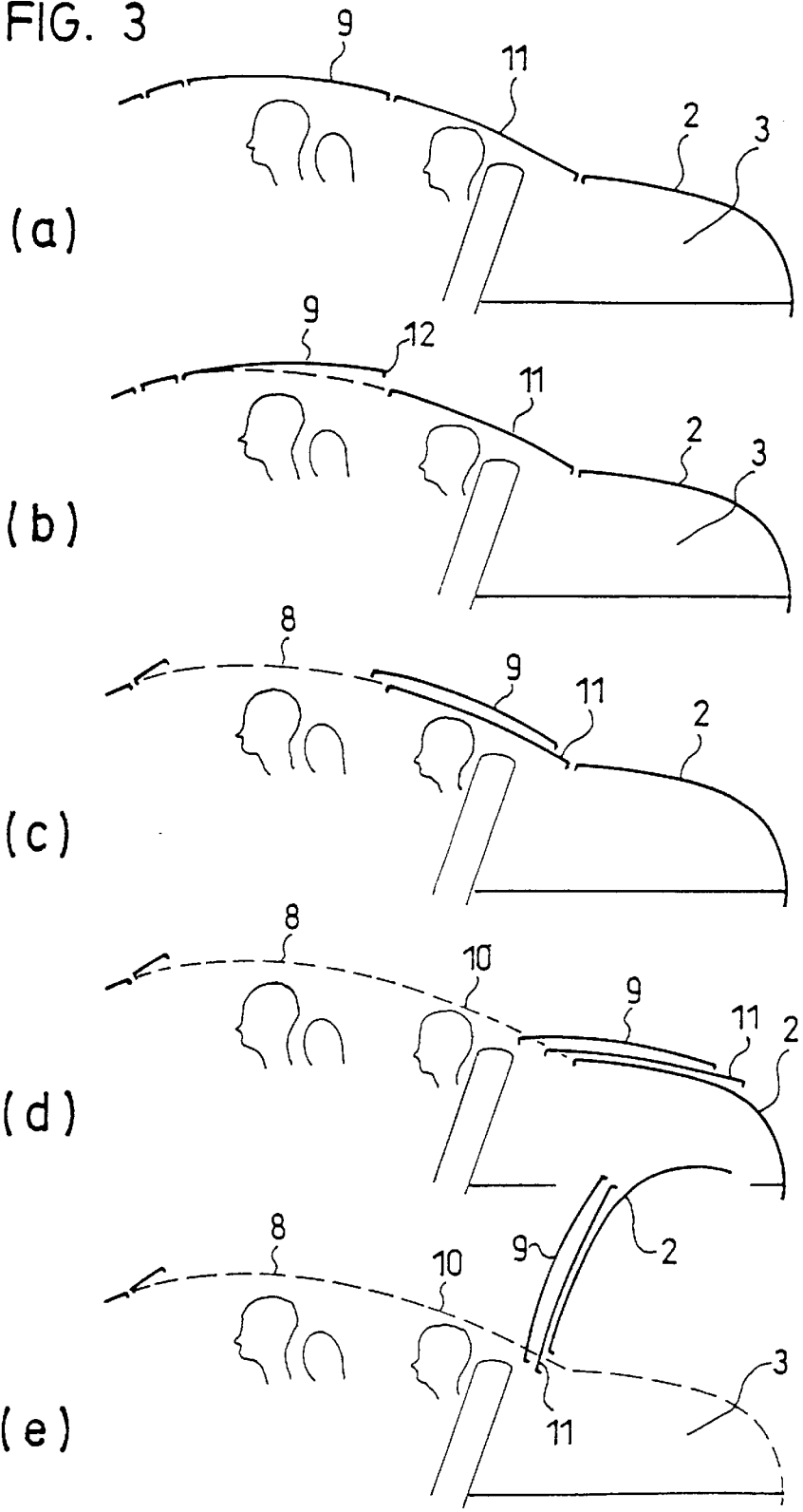
FIGS. 3(a) to 3(e) are lengthwise sectional views schematically representing the motor vehicle in various positions of the cover and the rear window.

A motor vehicle (see FIGS. 1 to 3), which in the illustrated embodiment is a passenger car like a coupe with a trunk 3 which can be closed by a trunk lid 2, has a roof 4 with side lengthwise roof beams 5 which adjoin the A columns 6 forward and pass to the rear into the C columns 7. Between the lengthwise roof beams 5, extends the roof opening 8 which is selectively closed (see FIG. 1) or at least partially cleared (FIG. 2) by a movably supported cover 9, especially a glass cover, formed of cover elements 9a, 9b. The roof opening 8 extends to the rear between the lengthwise roof beams 5 and the C columns 7 as far as the trunk 3 or the trunk lid 2 and in the area of a rear window opening 10 which is selectively closed (see FIG. 1) or at least partially cleared (FIG. 2) by a movable rear window 11.

The cover 9 is movably supported via a guide means on the lengthwise roof rails 5, and when opened, travels with its raised rear edge 12 over the rear window 11, the lateral rear sliding element of the cover 9 being guided either on a guide rail 13 on the lengthwise roof beam 5 and on the C column 7 or on the guide rail 14 on the rear window 11. The cover 9 can be positioned in the intermediate open positions in which it partially clears the roof opening 8, or it is moved completely over the rear window 11.

Figure 5:
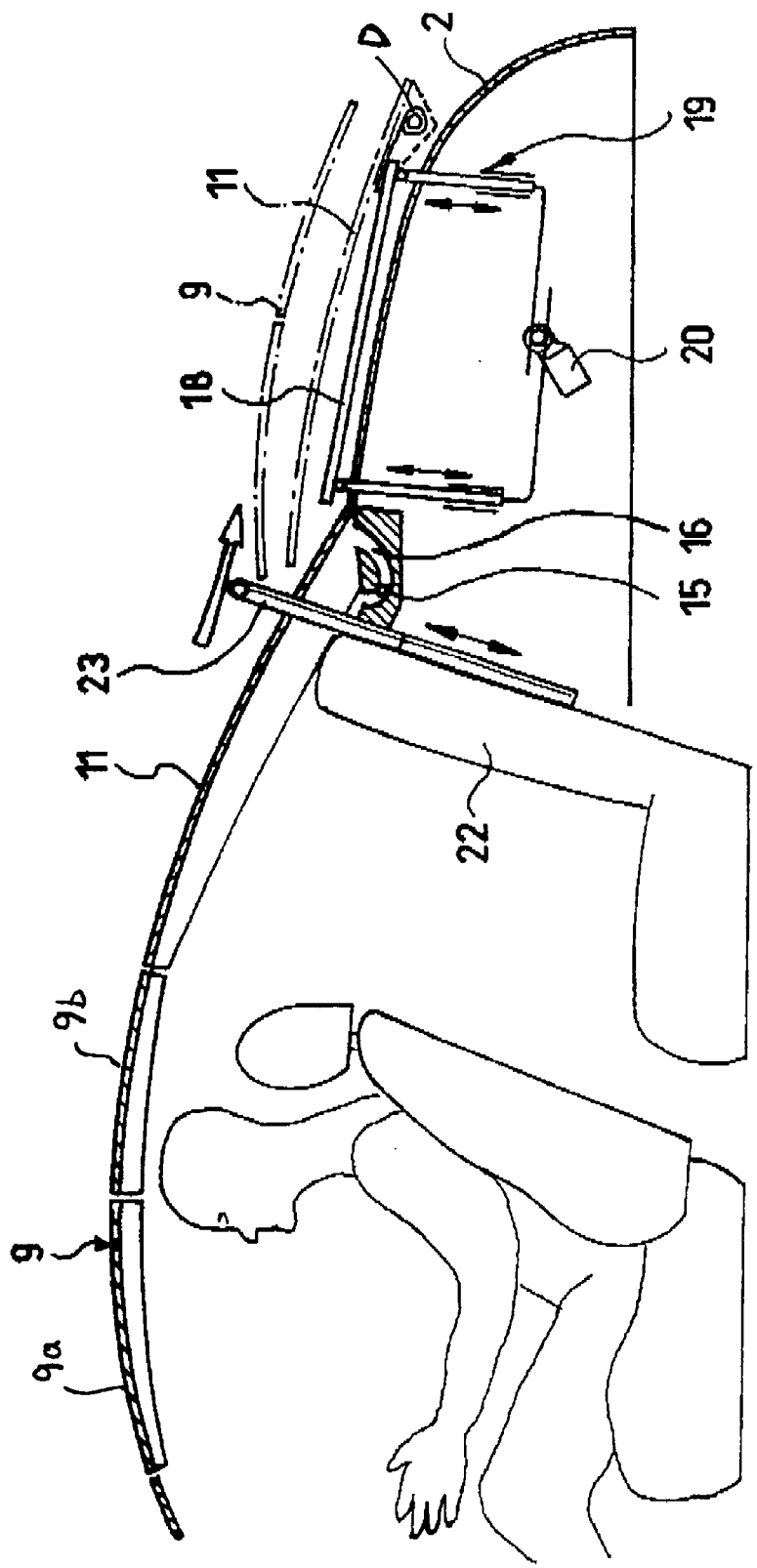
FIG. 5 is a lengthwise sectional view showing a schematic representation of the motor vehicle with the cover and the rear window in the closed position.

To further open the roof opening 8, the rear window 11 which is movably supported laterally via a respective front sliding element on each guide rail 13 on the lengthwise roof beam 5 and the C column 7 and via a rear sliding element 15 (see FIG. 5) on a guide slot 16, together with the cover 9, is pushed by a drive means D to the rear onto the trunk lid 2 (dot-dash line position). Here, initially, the rear sliding element 15 slides on an ascending section of the guide slot 16 so that the rear edge 17 of the rear window 11, and thus also the rear window 11, is lifted out of the window seal. Then, the rear sliding element 15 or another guide means of the rear window 11 engages the guide means on the trunk lid 2. The guide means is, for example, a guide rail (not shown) which runs in the lengthwise direction, which is located in the surface of the trunk lid 2 or recessed below it, and in which the guide means or the rear sliding element 15 is movably held. The sliding element 15 has a bearing foot dimensioned such that the rear window 11 is kept spaced away from the surface of the trunk lid 2.

In one preferred embodiment, the guide rail 18 is located on a carrier means 19 which is movably located in the trunk lid 2. In the closed position (see FIGS. 1 & 5), the carrier means 19 is lowered so that the guide rail 18 is located in the surface of the trunk lid 2 or is lowered under it and is covered especially by a cover. The carrier means 19 is extended, for example, by a drive by means of an electric motor 20 (see FIG. 5) in order to the rear window 11 and support it in the open position (see FIG. 2).

The carrier means 19 can alternatively also be located fixed in its position above the surface of the trunk lid 2.

The rear window 11, with the cover 9 resting on it, is supported in the open position both with the rear and also the front sliding element completely on the guide rail 18 in the position such that the trunk lid 2 can be opened in the conventional manner by swinging up, depending on the type of drive, for example, a drive cable leading from the trunk lid 2 to the body.

In one alternative embodiment, the front bearing or sliding element of the rear window 11 remains, in the open position of the rear window 11, on the guide rail 13 on the lengthwise roof beam 5 and the C column 7. The front bearing or sliding element contains a hinge which enables pivoting of the rear window 11 relative to the guide rail 13 when the trunk lid 2 is opened. The hinge is located in the open position of the rear window 11 feasibly in the pivot axis of the trunk lid 2.

The drive control for the cover 9 and the rear window 11 can be designed such that the rear window 11 can be moved to the rear into the ventilator position or partially open position, while the cover 9 remains in its closed position which closes the roof opening. The rear window 11 can also be moved entirely into its open position onto the trunk lid 2 when the cover 9 is closed.

Figure 4:
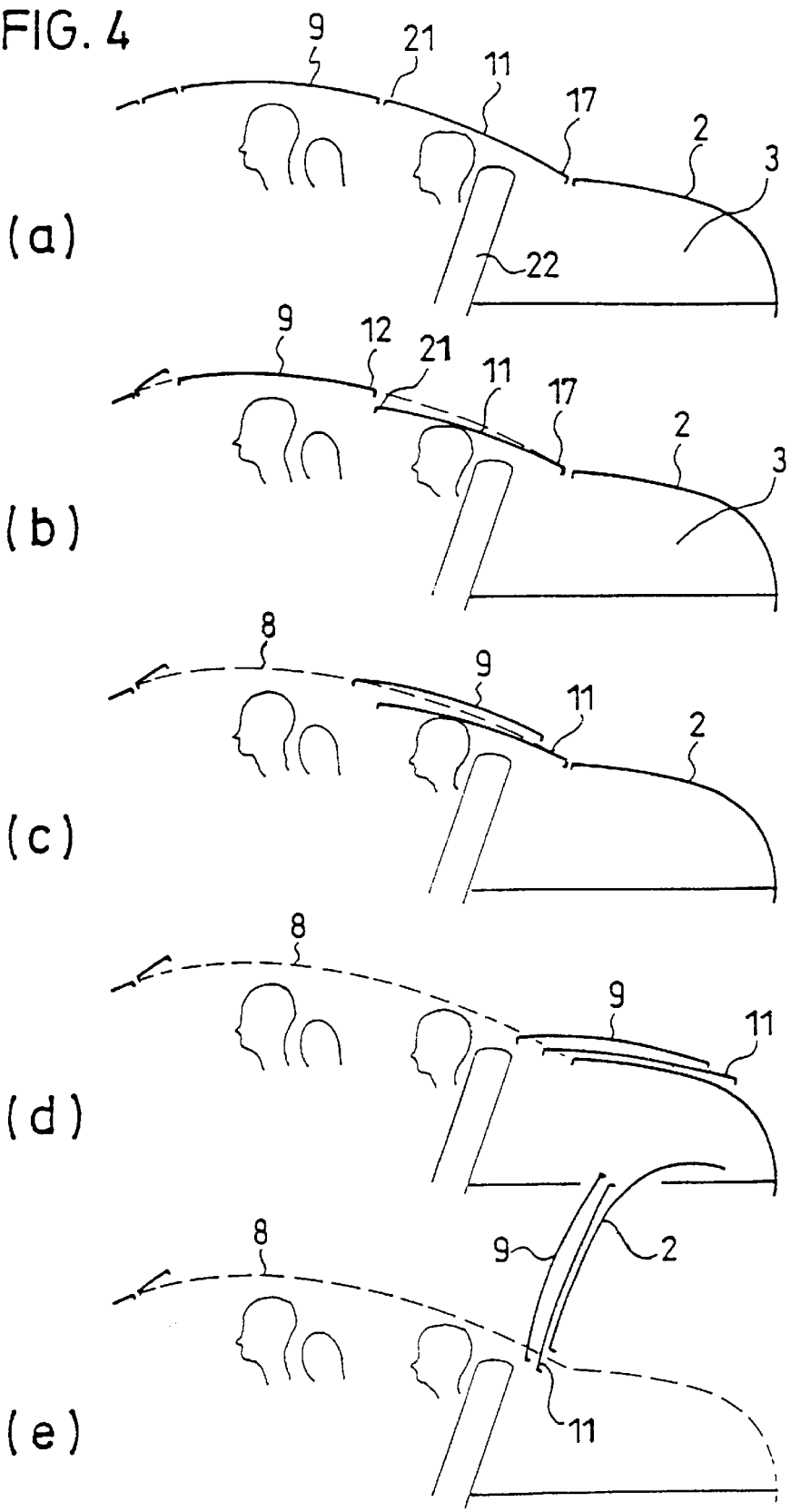
FIGS. 4(a) to 4(e) are lengthwise sectional views schematically representing the motor vehicle with another roof execution in various positions of the cover and the rear window.

To open the roof, in one alternative version, the rear window 11 can be swung around its rear edge 17 (see FIG. 4) by its front edge 21 being slightly lowered. This position can also be set as the ventilator position. Then, the cover 9 is moved along the guide rail 13 to the rear over the rear window 11 which has been lowered in this manner, and is moved together with the rear window 11 onto the trunk lid 2.

Behind the seats 22 which border the trunk 3, in the vehicle shown, i.e., the rear seats, there is a protection means 23 (FIG. 5) which, with the roof opened and the roof opening clear, if necessary, for example, in a rollover of the motor vehicle, can be extended upward into the protective position. The protection means 23 is made, for example, as a roll bar.

In the completely opened position of the motor vehicle roof (see FIG. 3), thus a roof opening with a size similar to a convertible is formed, but the lengthwise roof beams 5 and the C columns 7 remain in their position and form a rigid structure which, in the case of a rollover, impart a high level of protection to the passengers.

Figure 7:
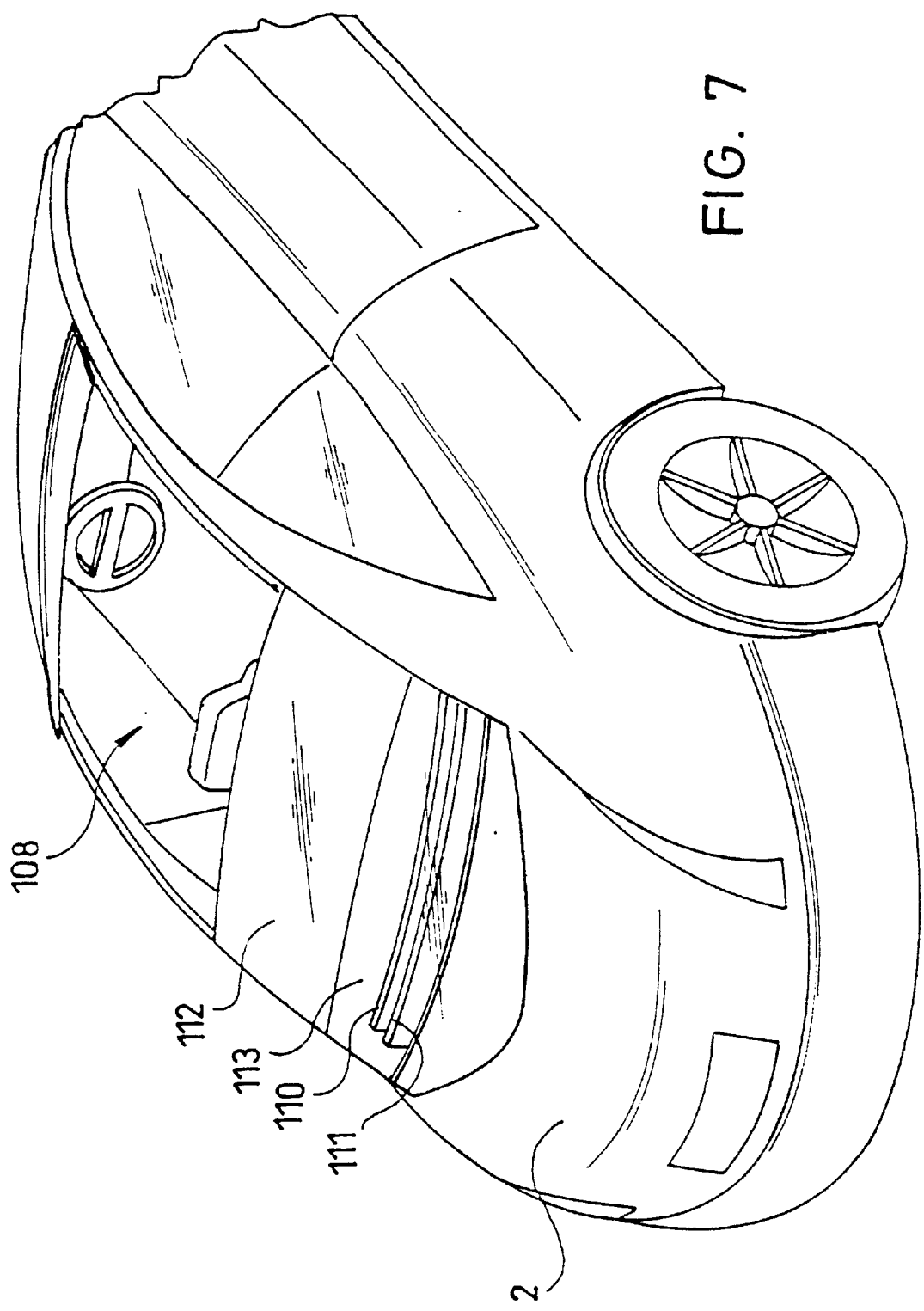
FIG. 7 is a perspective rear view of the motor vehicle as shown in FIG. 6 with a partially opened roof and two cover elements lowered into the storage space.
Figure 8:
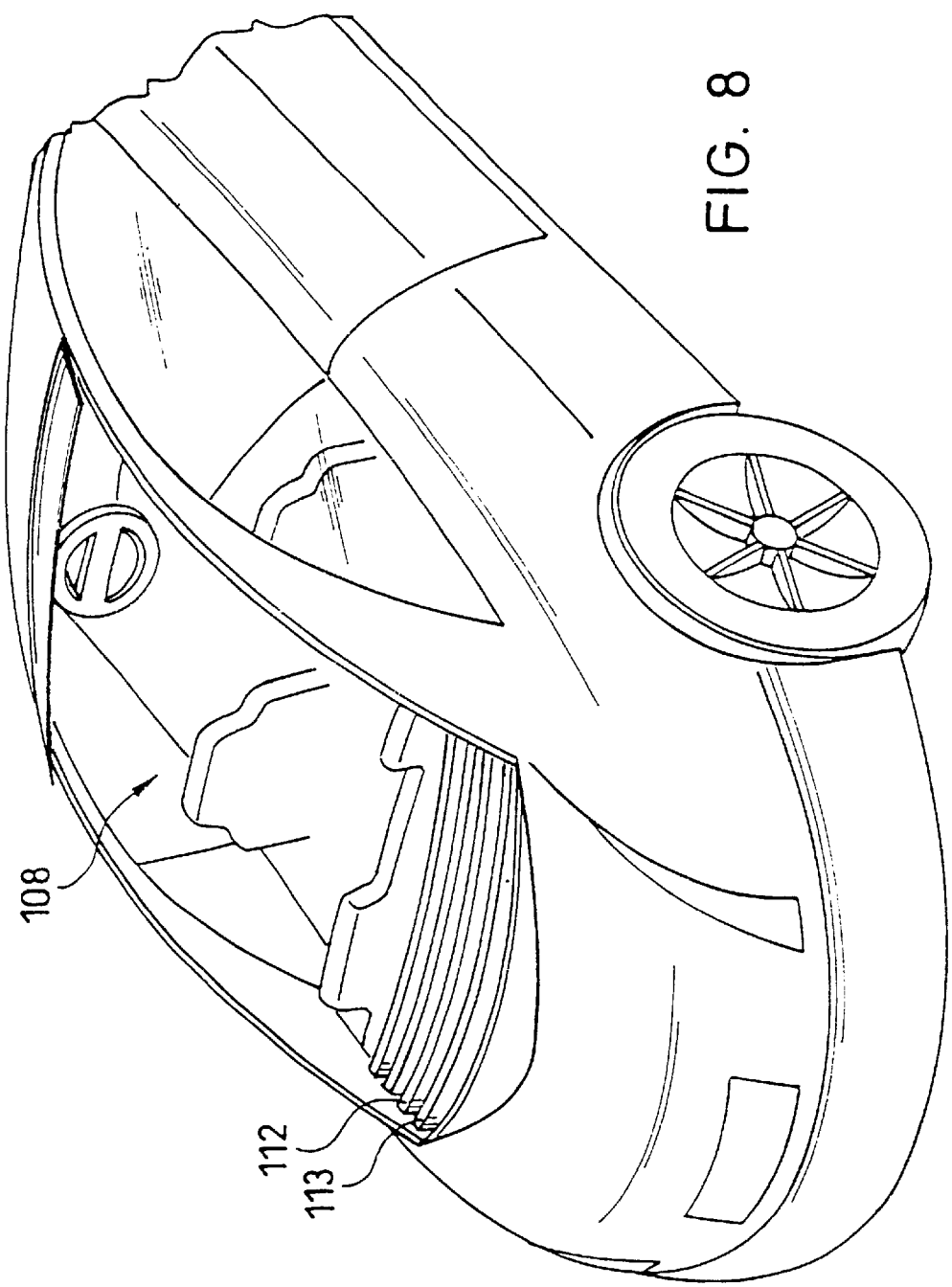
FIG. 8 shows, in a perspective rear view of the vehicle shown in FIG. 7, the motor vehicle with the roof opened and the four cover elements lowered in the storage space.

A second embodiment of the motor vehicle 101 in accordance with the invention (see FIGS. 6 to 11), which is likewise a passenger car like a coupe with a trunk 103 which can be closed by means of the trunk lid 102, has a motor vehicle roof 104 with lateral lengthwise roof beams 105 which adjoin the A columns 106 forward and pass to the rear into the C columns 107. Between the lengthwise roof beams 105, extends the roof opening 108 which is selectively closed (see FIG. 6) or partially or entirely cleared (FIGS. 7 & 8) by a roof arrangement 109 formed of, for example, four movably supported cover elements 110 to 113 which are especially transparent covers or glass covers.

Figure 6:
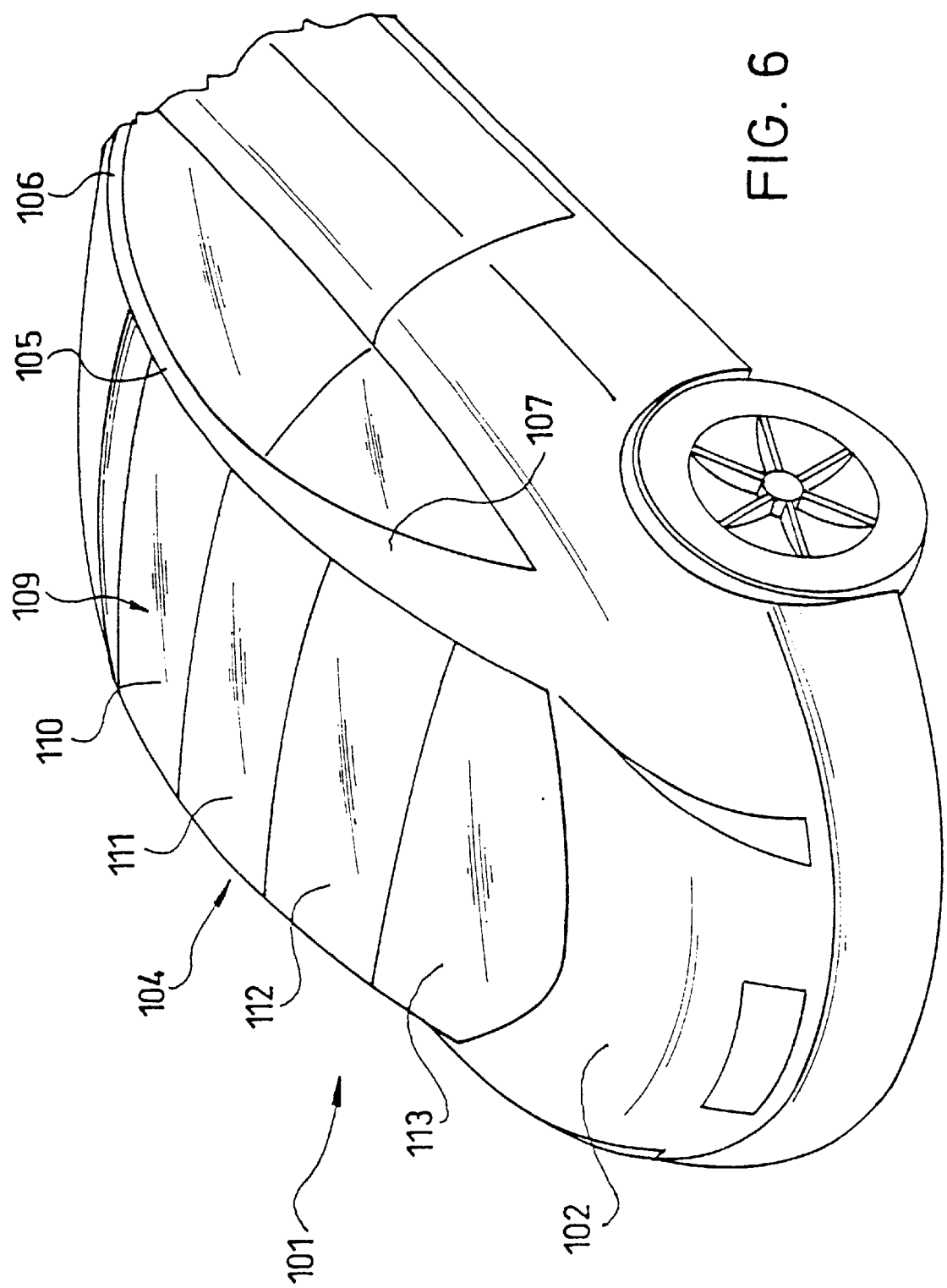
FIG. 6 is a perspective rear view of a second embodiment of a motor vehicle with a roof with four movable cover elements in the closed position.

The first and second cover elements 110, 111 are coupled to one another, and on their two narrow sides, are each movably supported on a guide rail 114 which extends along the lengthwise roof beam 105 and the C column down into a storage space 115 for the cover elements. The storage space 115 is located in the area of the trunk 103 which borders the vehicle interior or the seat back 116, for example of the rear seat of a four-seat coupe, and contains a fixed front wall 117 which is adjacent to the seat back and a rear wall 118 which can be moved via a mechanism; the rear wall can be moved out of a minimum position on the front wall 117 in which the cover elements 110 to 113 in their closed position as shown in FIG. 6 close the roof opening, if necessary, into the intermediate position or the maximum position into the trunk 103. In the intermediate position, the size of the storage space 115 is sufficient to accommodate the front two cover elements 110, 111. The maximum position of the rear wall 118 with the maximum storage space 115, is set in order to accommodate the two rear cover elements 112 and 113 which are movably supported according to the front cover elements 110 and 111 on another guide rail 119 which likewise extends along the lengthwise roof beam 105 and the C column 107 down into the storage space 115.

The two guide rails 114 and 119 are spaced apart from one another on the storage space 115 in the lengthwise direction of the motor vehicle so that the front cover elements 110 and 111, which are moved when opened as a coupled unit underneath the rear cover elements 112 and 113 on the guide rail 114 into the storage space 115, are located on the front wall 117. The front cover elements 110 and 111 are thus decoupled along their two bordering edges and are located vertically or slightly tilted in a space-saving parallel arrangement. The two rear cover elements 112 and 113 can be moved independently of the front cover elements 110 and 111 to the rear into the storage space 115, their bordering the extended rear wall 118.

According to different arrangements of the guide rails 114 and 119 also other deposition positions can be accomplished. The cover elements which are located tilted or vertical in the storage space are housed in a space-saving manner, protected against dirt, and do not obstruct vision to the rear.

The cover elements are pushed, for example, via electric drive motors and cable pull connections. The mechanism of the rear wall 118 of the storage space 115, moves by sustained forcing, depending on the movements of the cover elements 110 to 113. With the roof closed, thus the entire trunk cargo space remains available.

In addition to the opening motion described here, the cover elements can hang chain-like on one another and can be movably guided on a path, to open the roof in an overall motion of all the cover elements coupled to one another in the direction to the storage space first the rear cover element being deposited in the storage space, its coupling to the next forward element being canceled to the required degree. The next forward cover element is then located, in another overall displacement motion of all remaining cover elements, next to the already deposited cover element in the storage space. The remaining cover elements are accordingly deposited in the storage space in a stacked arrangement. The roof opens successively from front to back. Intermediate positions can also be set.

Figure 9:
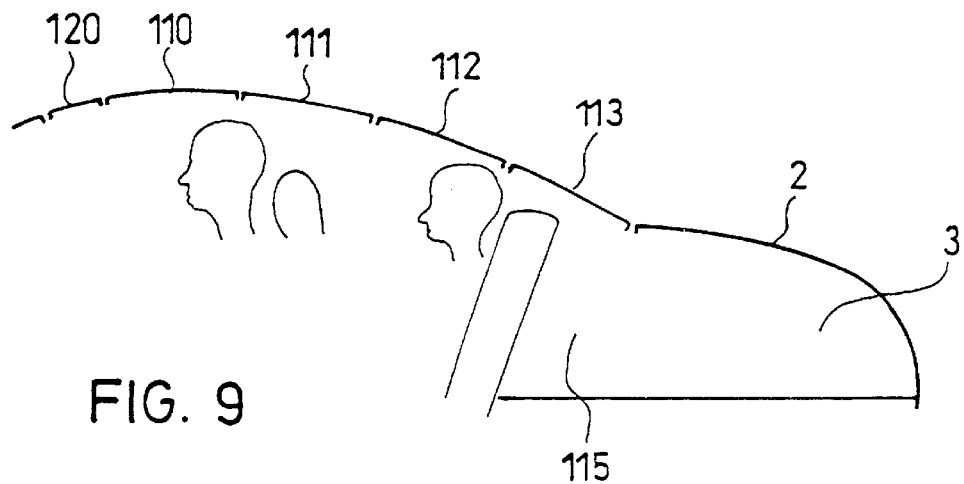
FIG. 9 is a lengthwise sectional view showing a schematic representation of the motor vehicle with the four cover elements closed.
Figure 10:
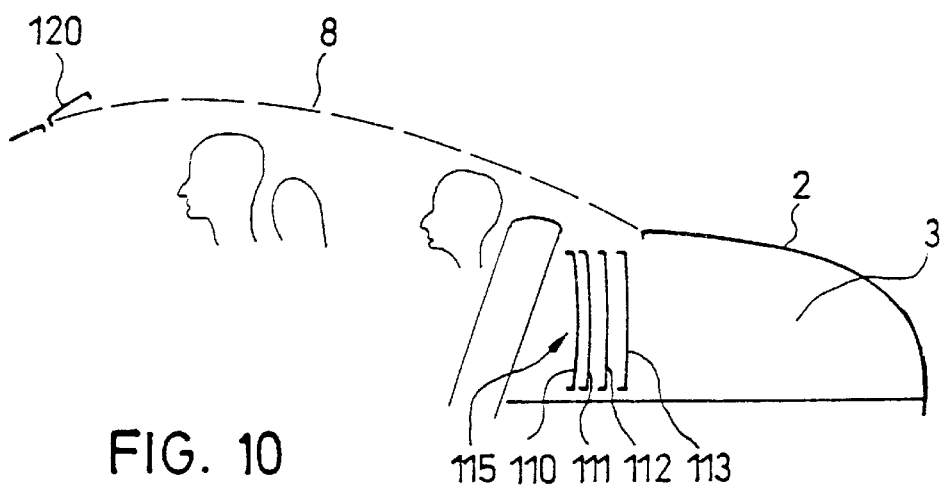
FIG. 10 shows a lengthwise sectional view showing a schematic representation of the motor vehicle with the roof opened and the four lowered cover elements.
Figure 11:
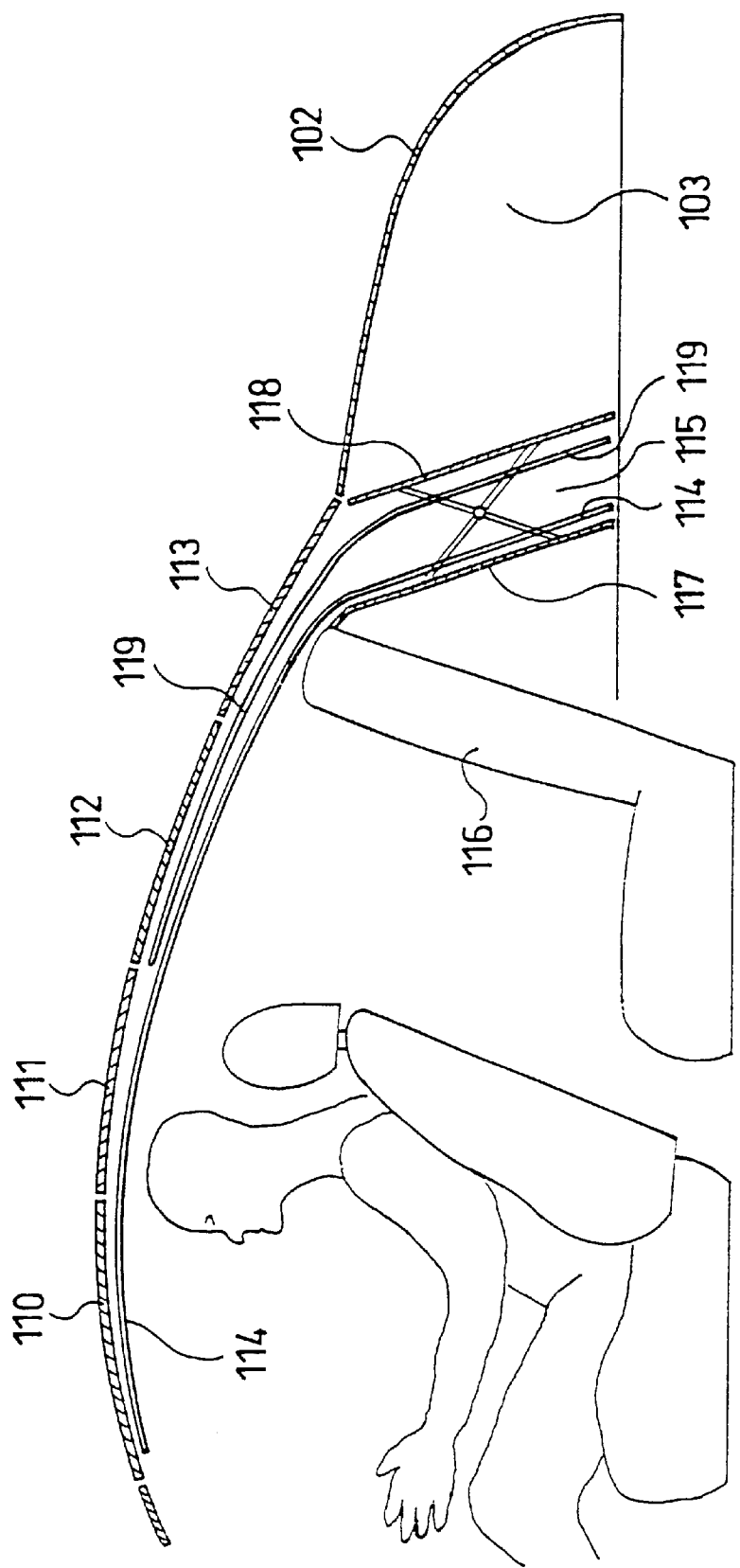
FIG. 11 shows, in a lengthwise sectional view, a schematic representation of the motor vehicle with the roof closed and the storage space.

A raisable wind deflector 120 can be mounted on the front edge of the roof opening, for example, on an apron (see FIGS. 9 and 10)

What is claimed is:

1. Motor vehicle comprising:
   a motor vehicle roof with body-mounted lengthwise roof beams and a roof opening;
   a movable cover for selectively closing and at least partially clearing the roof opening;
   a rear window which adjoins the motor vehicle roof; and a trunk lid;
   wherein the cover and the rear window are movable by guide means into an open position in which they are located on top of one another on the trunk lid.

2. Motor vehicle as claimed in claim 1, wherein the rear window is located on the trunk lid and the cover is located on the rear window in said open position.

3. Motor vehicle as claimed in claim 1, wherein the cover has bearing means and wherein the rear window has lateral guides for movably accommodating the bearing means of the cover.

4. Motor vehicle as claimed in claim 2, wherein the trunk lid is upwardly swingable with the rear window and the cover located thereon in said open position.

5. Motor vehicle as claimed in claim 1, wherein each lengthwise roof beam has a front guide rail for movably supporting the cover and a rear guide rail for movably supporting the rear window.

6. Motor vehicle as claimed in claim 5, wherein the rear guide rail borders a plurality of guides for the rear window that are located on the trunk lid.

7. Motor vehicle as claimed in claim 6, wherein the guides for the rear window are bilateral and located concealed on the trunk lid.

8. Motor vehicle as claimed in claim 1, wherein the trunk lid contains a carrier for the rear window.

9. Motor vehicle as claimed in claim 8, wherein the carrier is fixed on the trunk lid.

10. Motor vehicle as claimed in claim 8, wherein the carrier has a lowered inactive position and an extended operating position.

11. Motor vehicle as claimed in claim 10, wherein the position of the carrier in said operating position is adjustable relative to the trunk lid.

12. Motor vehicle as claimed in claim 10, wherein the carrier means has guide rails for the rear window.

13. Motor vehicle as claimed in claim 1, wherein the cover has a partially open position in which the cover is located on the rear window; and wherein the rear window with the cover located thereon is movable onto the trunk lid for completely opening the roof.

14. Motor vehicle as claimed in claim 1, wherein, at the beginning of an opening motion of the cover, the cover is raisable to over the rear window.

15. Motor vehicle as claimed in claim 1, wherein the rear window is mounted to pivot around a rear edge thereof for lowering of the rear window at a front edge thereof.

16. Motor vehicle as claimed in claim 1, wherein the rear window is lowerable at its front edge; and wherein the cover is adapted to perform an opening motion in which the cover is moved essentially along guide rails over the rear window after the rear window has been lowered at its front edge.

17. Motor vehicle as claimed in claim 1, wherein the cover and the rear window each has a respective drive device for movement thereof.

18. Motor vehicle as claimed in claim 1, wherein a drive device is provided on a rear edge of the rear window.

19. Motor vehicle as claimed in claim 18, wherein the drive motor of the rear window is covered by a cover.

20. Motor vehicle as claimed in claim 1, wherein the cover is formed of at least two successively arranged cover parts.

21. Motor vehicle as claimed in claim 1, wherein the rear window has a rear bearing means which is transferred to guides of the trunk lid when the rear window is opened.

22. Motor vehicle as claimed in claim 1, wherein there is a retractable head protector for vehicle passengers located near rear seats of the vehicle.

23. Motor vehicle as claimed in claim 1, wherein the rear window is openable into a ventilation position with the cover closed and can be moved onto the trunk lid.

24. Motor vehicle comprising:
   a motor vehicle roof with body-mounted lengthwise roof beams, C columns and a roof opening;

a movable cover arrangement which has at least two cover elements for selectively closing and at least partially clearing the roof opening;

a rear window which adjoins the motor vehicle roof; and a trunk lid;

wherein the roof opening extends essentially over the entire vehicle interior and wherein the cover elements are guided on lateral guides, which extend along the lengthwise roof beams and the C columns into a coverless rear storage space for clearing of the roof opening, the cover elements being depositable in the rear storage space in an essentially upright packed position on said guide rails.

25. Motor vehicle as claimed in claim 24, wherein some of the cover elements are coupled to one another and are movable in their entirety into the storage space independent of other of said cover elements.

26. Motor vehicle as claimed in claim 24, wherein the cover elements are independently movable into the storage space.

27. Motor vehicle as claimed in claim 24, wherein the storage space is located in a transition area between an interior rear wall of the vehicle and a front wall of the trunk of the vehicle.

28. Motor vehicle as claimed in claim 24, wherein the storage space has a trunk-side, movably located boundary which reduces the size of the storage space when the storage space is not being used and which is movable into the trunk so as to enlarge the storage space for depositing of the cover elements therein.

29. Motor vehicle as claimed in claim 25, wherein the cover arrangement has four cover elements.

30. Motor vehicle as claimed in claim 24, wherein each of a front pair of said cover elements and a rear pair of said cover elements are selectively movable along respective ones of said lateral guides into said storage space independent of each other.

31. Motor vehicle as claimed in claim 24, wherein storage space is located under a rearmost one of said cover elements.

* * * * *